United States Patent
Huiras et al.

(10) Patent No.: US 6,675,523 B1
(45) Date of Patent: Jan. 13, 2004

(54) FISHING HOLE COVER SYSTEM

(76) Inventors: Timothy R. Huiras, 526 Franklin St. SW., Hutchinson, MN (US) 55350; Mitchell A. Erickson, 590 Peterson Cir., Hutchinson, MN (US) 55350

( * ) Notice: Subject to any disclaimer, the term of this patent is extended or adjusted under 35 U.S.C. 154(b) by 0 days.

(21) Appl. No.: 10/237,527

(22) Filed: Sep. 6, 2002

(51) Int. Cl.[7] .............................................. A01K 97/01
(52) U.S. Cl. ........................................................... 43/4
(58) Field of Search ................................ 43/4, 17, 54.1

(56) References Cited

U.S. PATENT DOCUMENTS

| | | | | |
|---|---|---|---|---|
| 1,253,746 A | * | 1/1918 | Teeling | 43/17 |
| 2,914,926 A | * | 12/1959 | Meagher | 43/4 |
| 3,030,727 A | * | 4/1962 | Steuart | 43/56 |
| 3,059,451 A | * | 10/1962 | Anderson | 43/4 |
| 3,134,186 A | * | 5/1964 | Krueger | 43/4 |
| 3,555,827 A | * | 1/1971 | Herr | 43/4 |
| 3,694,950 A | | 10/1972 | Maier | 43/4 |
| 3,745,689 A | * | 7/1973 | Williams | 43/17 |
| 3,813,891 A | | 6/1974 | Wootten | 62/56 |
| 4,438,757 A | * | 3/1984 | Anderson | 43/4 |
| 4,662,099 A | * | 5/1987 | Stewart | 43/17 |
| 4,747,226 A | | 5/1988 | Todd | 43/4 |
| 4,787,166 A | * | 11/1988 | Vogt et al. | 43/17 |
| 4,794,718 A | * | 1/1989 | Tillman | 43/4 |
| 4,841,660 A | * | 6/1989 | James | 43/54.1 |
| 4,862,627 A | * | 9/1989 | Keller | 43/17 |
| 4,910,906 A | * | 3/1990 | Schefers et al. | 43/4 |
| 4,953,317 A | | 9/1990 | Ruchel | 43/17 |
| 4,993,182 A | * | 2/1991 | Monsen | 43/17 |
| 5,157,855 A | | 10/1992 | Schmidt et al. | 43/17 |
| D336,507 S | * | 6/1993 | Werner | D22/134 |
| 5,282,333 A | | 2/1994 | Klinkhamer | 43/4 |
| 5,911,569 A | | 6/1999 | Isakson | 43/17 |
| 5,938,023 A | * | 8/1999 | Herron et al. | 43/54.1 |
| 6,158,160 A | * | 12/2000 | Sykes | 43/17 |

FOREIGN PATENT DOCUMENTS

| | | | | |
|---|---|---|---|---|
| CA | 2203939 B1 | * | 10/1998 | |
| RU | 596201 B1 | * | 3/1978 | 43/4 |

* cited by examiner

Primary Examiner—Darren W. Ark

(57) ABSTRACT

A fishing hole cover system for allowing selective closing of a fishing hole within a fish house. The fishing hole cover system includes a base member positionable within a fishing hole of a fish house, and a cover member removably positionable within the base member for selectively closing the fishing hole. The base member is comprised of a base ring and a flanged portion extending from the base ring. The base member has a center opening within that has an inner edge extending inwardly from the base ring. The cover member has a cover ring with a plurality of nubs that catchably engage the inner edge of the base member when the cover member is closed upon the base member. A handle is preferably attached to the upper portion of the cover member.

18 Claims, 5 Drawing Sheets

FISHING HOLE COVER SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to fishing hole covers and more specifically it relates to a fishing hole cover system for allowing selective closing of a fishing hole within a fish house.

2. Description of the Related Art

Temporary and permanent fish houses for fishing upon an ice surface have been in use for years. A fish house typically has a floor, one or more walls and a ceiling. Within the floor, one or more fishing holes extend through for allowing the fisherman to drill ice holes and fish within the ice holes. Since the floor is typically comprised of a plywood material, the interior edge of the fishing holes typically are rough and unfinished looking.

The main problem with conventional fish houses is that they do not provide a convenient covering system for covering the fishing hole when not in use. Another problem with conventional fish houses is that the fishing holes typically have an unfinished appearance thereby depreciating the overall appearance of the fish house. Another problem with conventional fish houses is that the interior edges of the fishing holes are rough and prone to having objects and fish catch upon them thereby resulting in damage to the object and the fishing hole.

Examples of patented devices which may be related to the present invention include U.S. Pat. No. 5,911,569 to Isakson; U.S. Pat. No. 4,953,317 to Ruchel; U.S. Pat. No. 4,747,226 to Todd; U.S. Pat. No. 3,813,891 to Wootten; U.S. Pat. No. 3,694,950 to Maier; U.S. Pat. No. 5,157,855 to Schmidt et al.; and. U.S. Pat. No. 5,282,333 to Klinkhamer.

While these devices may be suitable for the particular purpose to which they address, they are not as suitable for allowing selective closing of a fishing hole within a fish house. Conventional fishing holes within a fish house are unfinished and are prone to damage over a period of time.

In these respects, the fishing hole cover system according to the present invention substantially departs from the conventional concepts and designs of the prior art, and in so doing provides an apparatus primarily developed for the purpose of allowing selective closing of a fishing hole within a fish house.

BRIEF SUMMARY OF THE INVENTION

In view of the foregoing disadvantages inherent in the known types of fish houses now present in the prior art, the present invention provides a new fishing hole cover system construction wherein the same can be utilized for allowing selective closing of a fishing hole within a fish house.

The general purpose of the present invention, which will be described subsequently in greater detail, is to provide a new fishing hole cover system that has many of the advantages of the fish houses mentioned heretofore and many novel features that result in a new fishing hole cover system which is not anticipated, rendered obvious, suggested, or even implied by any of the prior art fish houses, either alone or in any combination thereof.

To attain this, the present invention generally comprises a base member positionable within a fishing hole of a fish house, and a cover member removably positionable within the base member for selectively closing the fishing hole. The base member is comprised of a base ring and a flanged portion extending from the base ring. The base member has a center opening within that has an inner edge extending inwardly from the base ring. The cover member has a cover ring with a plurality of nubs that catchably engage the inner edge of the base member when the cover member is closed upon the base member. A handle is preferably attached to the upper portion of the cover member.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a fishing hole cover system that will overcome the shortcomings of the prior art devices.

A second object is to provide a fishing hole cover system for allowing selective closing of a fishing hole within a fish house.

Another object is to provide a fishing hole cover system that improves the overall appearance of the interior of a fish house.

An additional object is to provide a fishing hole cover system that finishes and provides a professional look to the fishing holes.

A further object is to provide a fishing hole cover system that may be installed upon new or existing fish houses.

Another object is to provide a fishing hole cover system that may be utilized upon various sizes and shapes of fishing holes.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
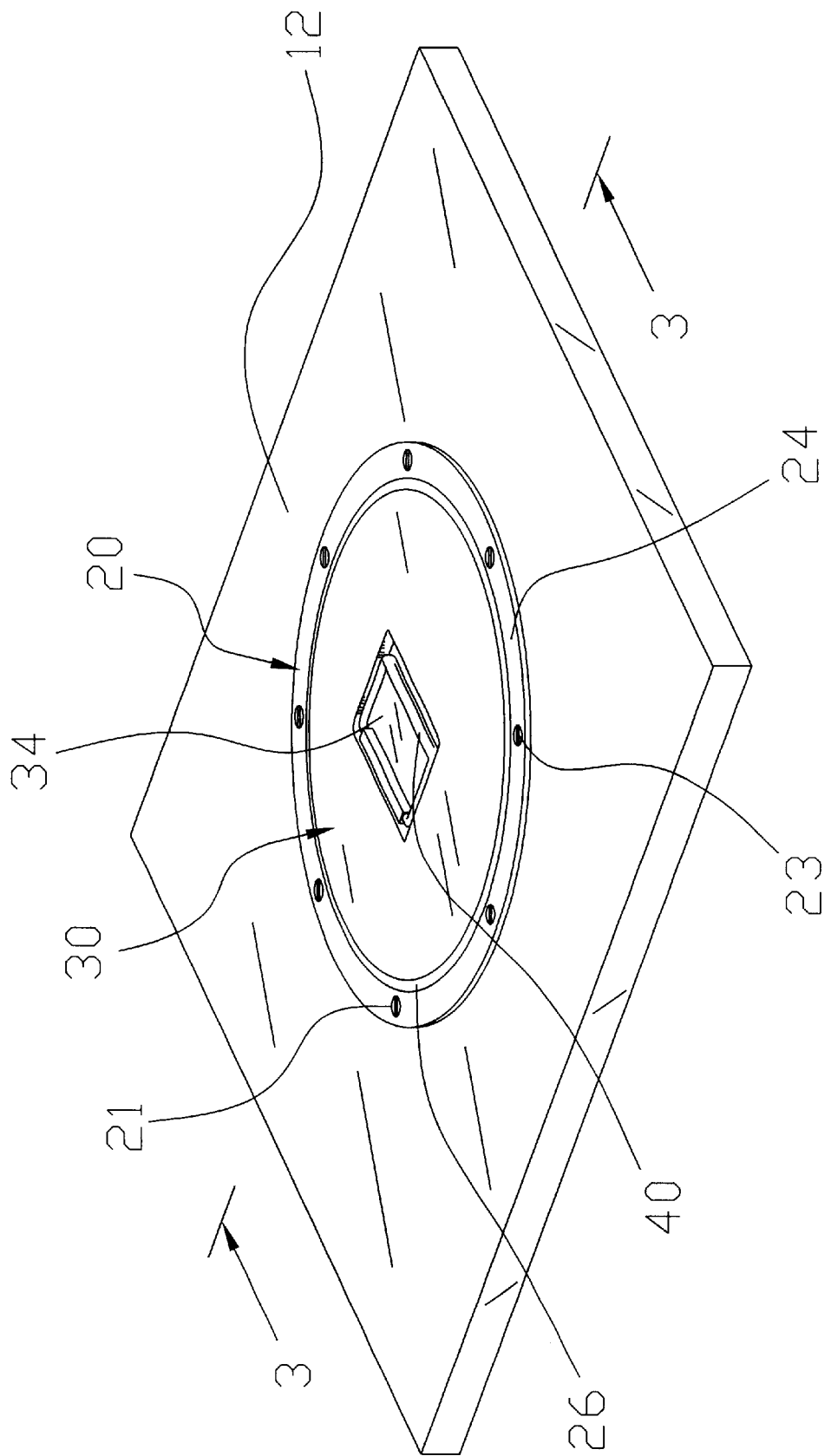
FIG. 1 is an upper perspective view of the present invention.

Turning now descriptively to the drawings, in which similar reference characters denote similar elements throughout the several views, FIGS. 1 through 5 illustrate a fishing hole cover system 10, which comprises a base member 20 positionable within a fishing hole of a fish house, and a cover member 30 removably positionable within the base member 20 for selectively closing the fishing hole. The base member 20 is comprised of a base ring 22 and a flanged portion 24 extending from the base ring 22. The base member 20 has a center opening within that has an inner edge 28 extending inwardly from the base ring 22. The cover member 30 has a cover ring 32 with a plurality of nubs 36 that catchably engage the inner edge 28 of the base member 20 when the cover member 30 is closed upon the base member 20. A handle 40 is preferably attached to the upper portion of the cover member 30.

Figure 2:
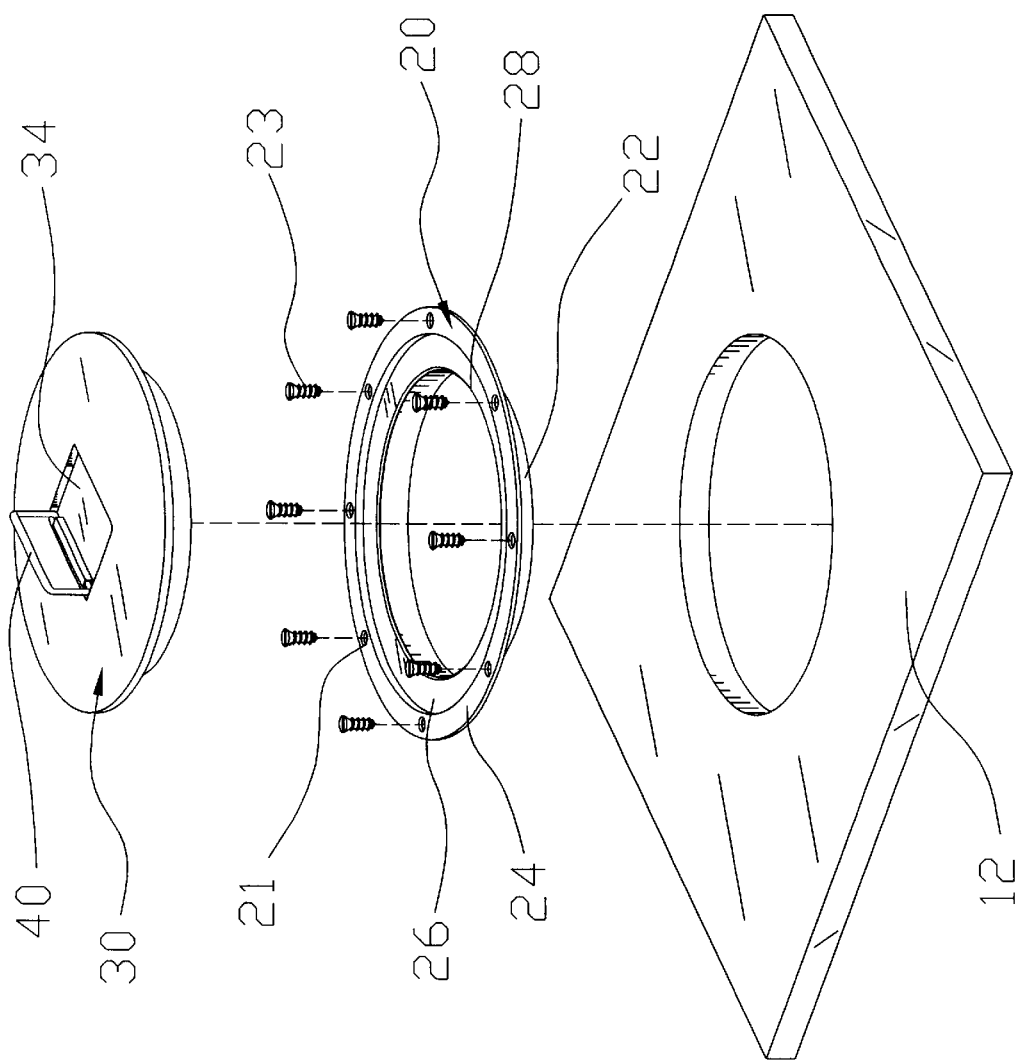
FIG. 2 is an exploded upper perspective view of the present invention.
Figure 3:
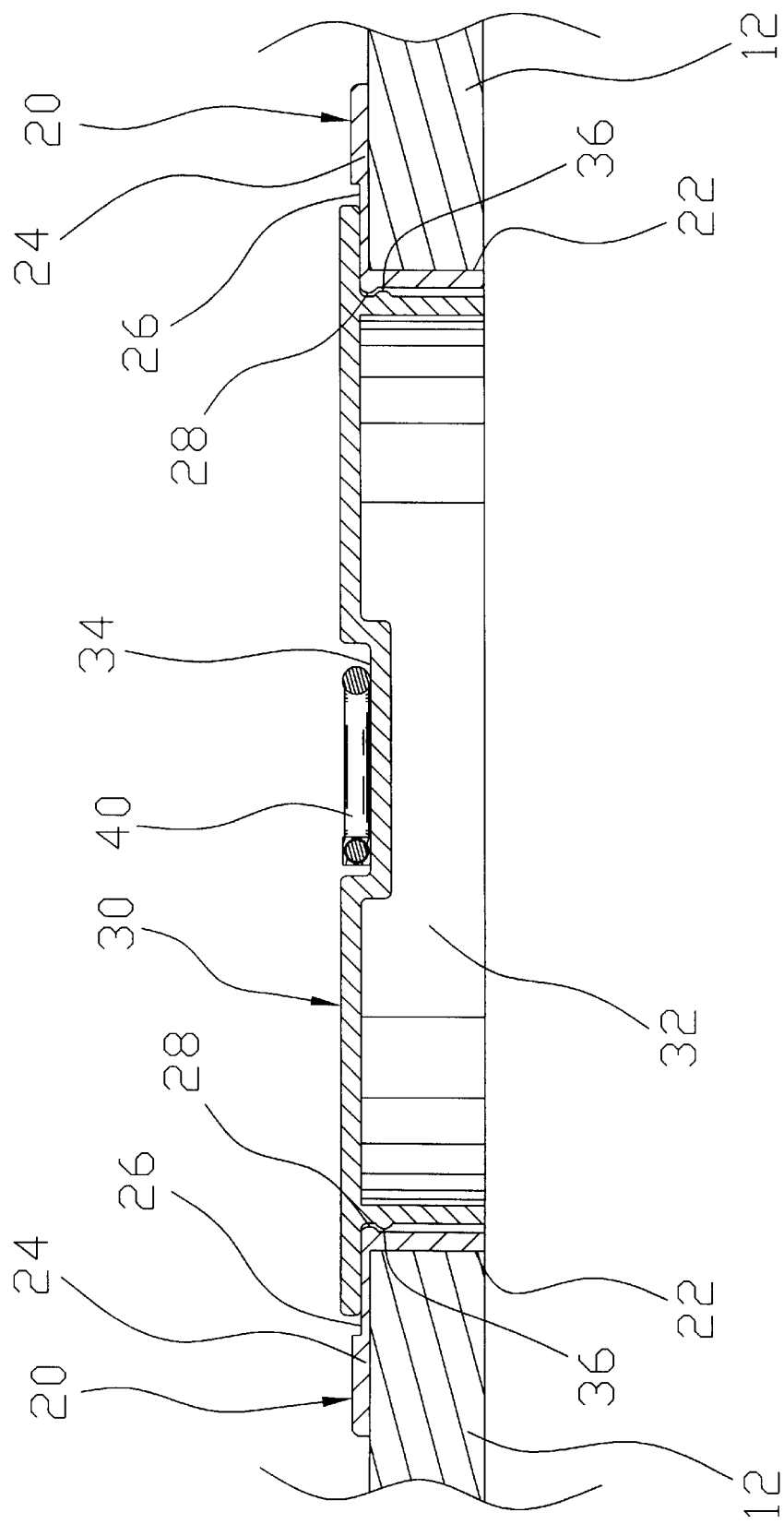
FIG. 3 is a cross sectional view taken along line 3—3 of FIG. 1.
Figure 4:
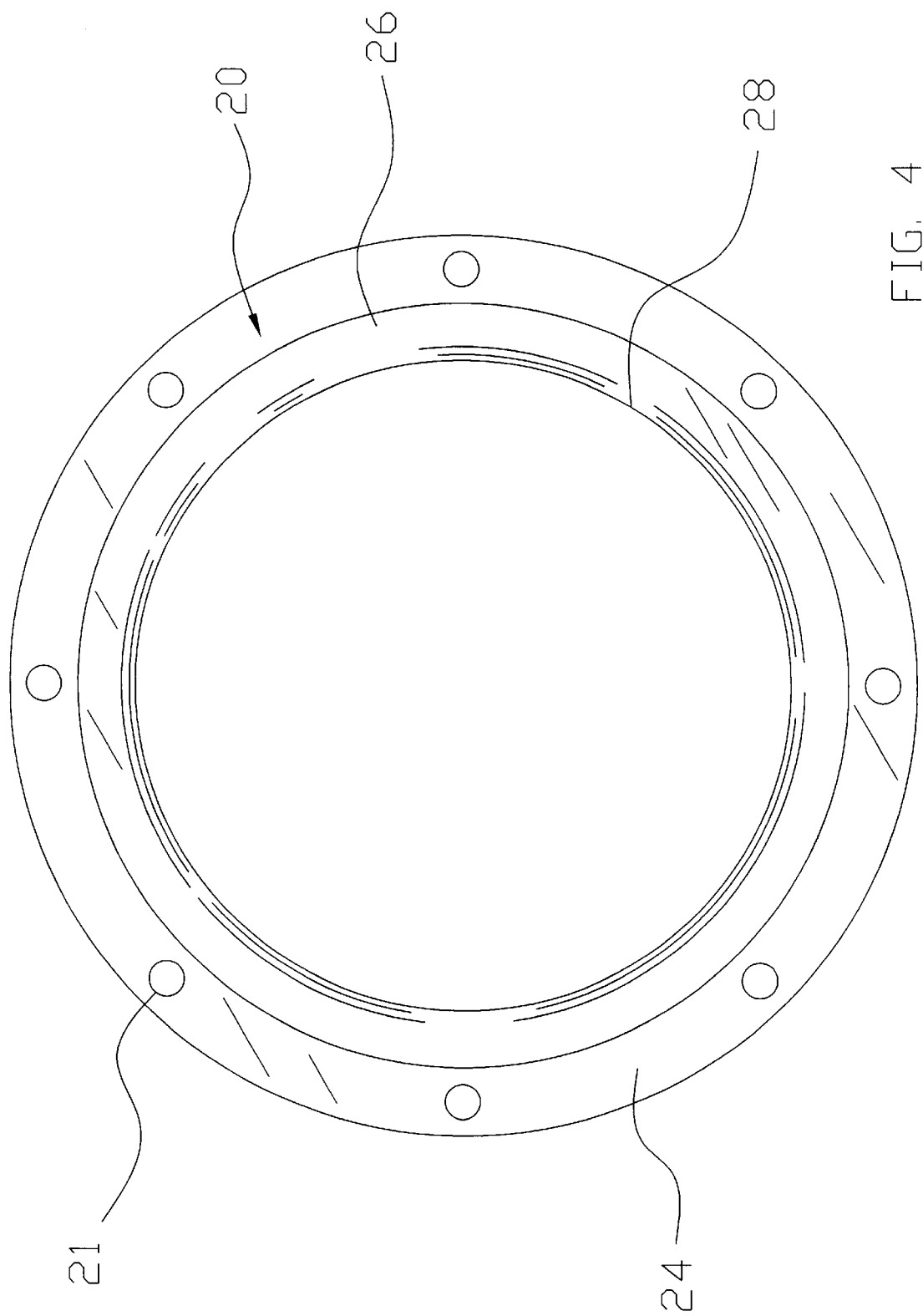
FIG. 4 is a top view of the base member.

As shown in FIGS. 2 and 3 of the drawings, the base member 20 has a base ring 22 that has an exterior positionable against an inner portion of the fishing hole within the floor 12 of a fish house. The base ring 22 defines a center opening that corresponds to the ice hole below the fish hole of the fish house. The base ring 22 is formed to the shape and size of the fishing hole. FIG. 4 illustrates the base member 20 as having a circular shape, however various other shapes may be utilized to construct the base member 20 in order to form to the fishing hole of a fish house. The base member 20 is preferably comprised of a non-corrosive material such as but not limited to plastic.

A flanged portion 24 extends from an upper edge of the base ring 22 outwardly as best illustrated in FIGS. 2 and 4 of the drawings. The flanged portion 24 preferably extends transversely from the base ring 22 as best illustrated in FIG. 3 of the drawings. The flanged portion 24 preferably has a plurality of apertures 21 for receiving a plurality of fasteners 23 that secure the base member 20 to the floor 12 as shown in FIG. 2 of the drawings. The apertures 21 may be spaced apart at various distances as desired.

As shown in FIGS. 2 through 4 of the drawings, the flanged portion 24 includes a recessed portion 26 extending from an inner portion to a middle portion of the flanged portion 24. The recessed portion 26 is for receiving the outer portion of the cover member 30 forming a relatively flat structure upon the floor 12 as illustrated in FIG. 1 of the drawings. The outer edge of the recessed portion 26 is preferably formed to the size and shape of the outer edge of the cover member 30 as best show in FIGS. 1 through 3 of the drawings.

As shown in FIGS. 3 and 4 of the drawings, the center opening of the base member 20 includes an inner edge 28 extending from the base ring 22 for catchably engaging the cover member 30. The inner edge 28 extends a finite distance inwardly and is preferably rounded for facilitating securing and removing of the cover member 30 with respect to the base. member 20 as best shown in FIG. 3 of the drawings.

As shown in FIGS. 1, 2, 3 and 5 of the drawings, the cover member 30 has a generally flat upper portion. The cover member 30 has a shape similar to the recessed portion 26 of the base member 20 for providing a relatively smooth surface when secured to the base member 20 as shown in FIGS. 1 through 3 of the drawings. The cover member 30 is preferably comprised of a non-corrosive material such as but not limited to plastic.

The upper surface of the cover member 30 preferably includes a depressed portion 34 as shown in FIGS. 1, 2, 3 and 5 of the drawings. The depressed portion 34 is formed for receiving a handle 40 when the handle 40 is folded in a contracted position as shown in FIG. 3 of the drawings. The depressed portion 34 may have various shapes capable of receiving the handle 40 when laid flat upon the cover member 30. The handle 40 is preferably pivotally attached to the cover member 30 for allowing flat or extended positions. The handle 40 may have various shapes such as but not limited to rectangular.

Figure 5:
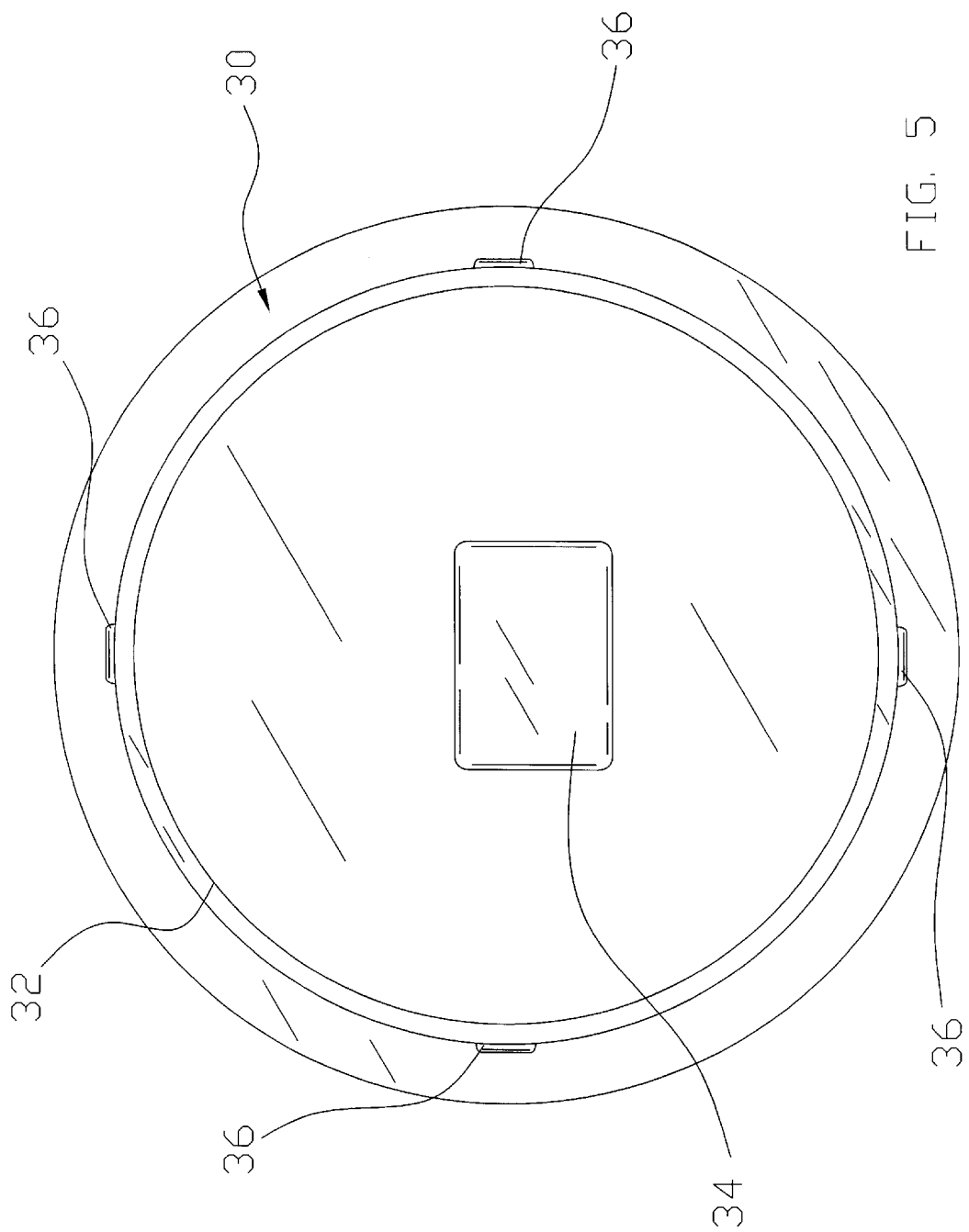
FIG. 5 is a bottom view of the cover member.

The cover member 30 preferably includes a cover ring 32 that extends downwardly within the base ring 22 of the base member 20 as best illustrated in FIG. 3 of the drawings. The cover ring 32 has a shape similar to the base ring 22 and preferably has a plurality of nubs 36 extending outwardly from thereof for catchably engaging the inner edge 28 of the base member 20 as best illustrated in FIGS. 3 and 5 of the drawings. The nubs 36 are preferably spaced apart on four opposing sides of the cover ring 32 as shown in FIG. 5 of the drawings, however the nubs 36 may be positioned in various other positioned upon the cover ring 32. The nubs 36 are preferably comprised of a rounded structure similar to the inner edge 28 as best illustrated in FIG. 3 of the drawings.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A fishing hole cover system for enclosing a fishing hole within a fish house, comprising:

a base member having a base ring and a flanged portion extending from said base ring, wherein said base ring has an outer diameter smaller than an inner diameter of said fishing hole when it is placed therein; and a cover member having an upper flat portion and a cover ring having a cylindrical outer surface extending downwardly from said upper flat portion, wherein said cover ring has a smaller outer diameter than an inner diameter of said base ring wherein said base member includes an inner edge extending inwardly, wherein said inner edge is rounded;

wherein said cover member includes a plurality of nubs extending outwardly from an upper portion of said cover ring for catchably engaging said inner edge, wherein said plurality of nubs are rounded, and wherein said inner edge is captured between said upper flat portion and said plurality of nubs when said cover member is engaged within said base member.

2. The fishing hole cover system of claim 1, wherein said flanged portion includes a plurality of apertures for receiving a corresponding plurality of fasteners for securing said base member to a floor of the fish house.

3. The fishing hole cover system of claim 1, wherein said upper flat portion of said cover member extends a finite distance outwardly from said cover ring.

4. The fishing hole cover system of claim 3, wherein said base member includes a recessed portion within an upper surface for receiving said flat upper portion extending past said cover ring.

5. The fishing hole cover system of claim 1, wherein said base member and said cover member have a circular shape.

6. The fishing hole cover system of claim 1, wherein said base ring has a height at least the thickness of a floor of the fish house when it is attached thereto.

7. The fishing hole cover system of claim 1, wherein an outer surface of said base ring is juxtaposable to said fishing hole in a snug manner.

8. A fishing hole cover system for enclosing a fishing hole within a fish house, comprising:

a base member having a base ring and a flanged portion extending from the said base ring, wherein said base ring has an outer diameter smaller than an inner diameter of said fishing hole when it is placed therein; and a cover member having an upper flat portion and a cover ring extending downwardly from said upper flat portion, wherein said cover ring has a smaller outer diameter than an inner diameter of said base ring; and a handle pivotally attached to an upper surface of said cover member;

wherein said base member includes an inner edge extending inwardly, wherein said inner edge is rounded;

wherein said cover member includes a plurality of nubs extending outwardly from an upper portion of said cover ring for catchably engaging said inner edge, wherein said plurality of nubs are rounded, and wherein said inner edge is captured between said upper flat portion and said plurality of nubs when said cover member is engaged within said base member.

9. The fishing hole cover system of claim 8, wherein said flanged portion includes a plurality of apertures for receiving a corresponding plurality of fasteners for securing said base member to a floor of the fish house.

10. The fishing hole cover system of claim 8, wherein said upper flat portion of said cover member extends a finite distance outwardly from said cover ring.

11. The fishing hole cover system of claims 10, wherein said base member includes a recessed portion within an upper surface for receiving said flat upper portion extending past said cover ring.

12. The fishing hole cover system of claim 8, wherein said base member and said cover member have a circular shape.

13. The fishing hole cover system of claim 8, wherein said base ring has a height at least the thickness of a floor of the fish house when it is attached thereto.

14. The fishing hole cover system of claim 8, wherein said upper surface of said cover member includes a depressed portion for receiving said handle.

15. A fishing hole cover system for enclosing a fishing hole within a fish house, comprising:

a base member having a base ring and a flanged portion extending from said base ring, wherein said base ring has an outer diameter smaller than an inner diameter of said fishing hole when it is placed therein; and a cover member having an upper flat portion and a cover ring having a cylindrical outer surface extending downwardly from said upper flat portion, wherein said cover ring has a smaller outer diameter than an inner diameter of said base ring;

wherein said base member includes an inner edge extending inwardly, wherein said inner edge is rounded;

wherein said cover member includes a plurality of nubs extending outwardly from an upper portion of said cover ring for catchably engaging said inner edge, wherein said plurality of nubs are rounded, and wherein said inner edge is captured between said upper flat portion and said plurality of nubs when said cover member is engaged within said base member;

wherein said flanged portion includes a plurality of apertures for receiving a corresponding plurality of fasteners for securing said base member to a floor of the fish house;

wherein said upper flat portion of said cover member extends a finite distance outwardly from said cover ring;

wherein said base member includes a recessed portion within an upper surface for receiving said flat upper portion extending past said cover ring.

16. The fishing hole cover system of claim 15, wherein said base member and said cover member have a circular shape.

17. The fishing hole cover system of claim 15, wherein said base ring has a height at least the thickness of a floor of the fish house when it is attached thereto.

18. The fishing hole cover system of claim 15, wherein an outer surface of said base ring is juxtaposable to said fishing hole in a snug manner.

\* \* \* \* \*